US012647415B2

(12) United States Patent
Wang et al.

(10) Patent No.: US 12,647,415 B2
(45) Date of Patent: Jun. 2, 2026

(54) GESTURE-BASED USER AUTHENTICATION

(71) Applicant: FMR LLC, Boston, MA (US)

(72) Inventors: Hangyu Wang, Cary, NC (US);
Michael Contino, Quincy, MA (US);
Jamie Barras, Apex, NC (US)

(73) Assignee: FMR LLC, Boston, MA (US)

( * ) Notice: Subject to any disclaimer, the term of this patent is extended or adjusted under 35 U.S.C. 154(b) by 86 days.

(21) Appl. No.: 18/631,716

(22) Filed: Apr. 10, 2024

(65) Prior Publication Data

US 2025/0323911 A1 Oct. 16, 2025

(51) Int. Cl.
H04L 9/40 (2022.01)
G06F 21/32 (2013.01)
G06T 7/246 (2017.01)
G06V 40/20 (2022.01)

(52) U.S. Cl.
CPC .......... H04L 63/0861 (2013.01); G06F 21/32 (2013.01); G06T 7/246 (2017.01); G06V 40/28 (2022.01)

(58) Field of Classification Search
CPC ... H04L 63/0861; G06F 21/316; G06T 7/246; G06V 40/28
See application file for complete search history.

(56) References Cited

U.S. PATENT DOCUMENTS

| | | | | | |
|---|---|---|---|---|---|
| 9,355,236 | B1 * | 5/2016 | Kratz | ...................... | G06F 3/017 |
| 2014/0109018 | A1 * | 4/2014 | Casey | ................ | G06F 3/04883 |
| | | | | | 715/863 |
| 2015/0154394 | A1 * | 6/2015 | Kapinos | ................. | G06F 21/31 |
| | | | | | 726/19 |
| 2017/0098068 | A1 * | 4/2017 | Mantri | ................. | G06F 3/0346 |
| 2017/0200046 | A1 * | 7/2017 | Bang | .................. | H04L 63/0861 |
| 2018/0060550 | A1 * | 3/2018 | Li | ........................... | G06F 3/017 |
| 2020/0364716 | A1 * | 11/2020 | Pickering | ............... | G06V 40/10 |
| 2021/0056188 | A1 * | 2/2021 | Colon | ................... | G06F 3/0483 |
| 2023/0306097 | A1 * | 9/2023 | Finney | .................... | G06F 21/32 |
| 2024/0111851 | A1 * | 4/2024 | Lock | ...................... | A61B 5/117 |

* cited by examiner

*Primary Examiner* — Boris D Grijalva Lobos
(74) *Attorney, Agent, or Firm* — Cesari and McKenna, LLP

(57) ABSTRACT

A computerized method is provided for user authentication using hand gestures. Multiple points on a user's hand can be tracked using cameras or various sensors and the motion of those points in space and relative to each other can used to create gesture-based passwords. Such user authentication techniques have advantages in augmented and virtual reality applications where traditional text-based passwords may be difficult. Gesture-based user authentication can be augmented with physical characteristics of the specific user's fingers and hands including size, shape, and distinguishing marks to enhance security.

21 Claims, 5 Drawing Sheets

100

Figure 2:
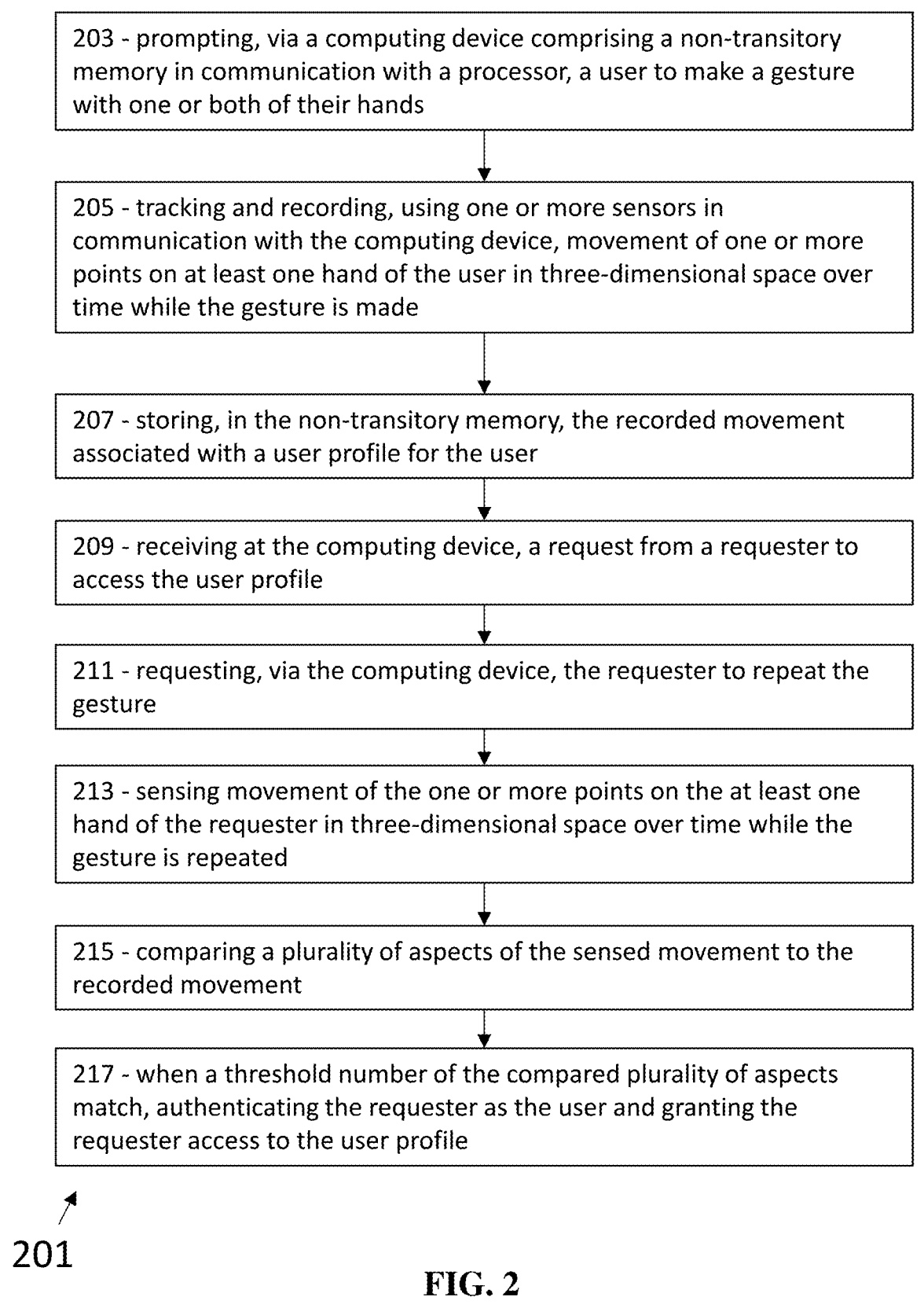

203 - prompting, via a computing device comprising a non-transitory memory in communication with a processor, a user to make a gesture with one or both of their hands 205 - tracking and recording, using one or more sensors in communication with the computing device, movement of one or more points on at least one hand of the user in three-dimensional space over time while the gesture is made 207 - storing, in the non-transitory memory, the recorded movement associated with a user profile for the user 209 - receiving at the computing device, a request from a requester to access the user profile 211 - requesting, via the computing device, the requester to repeat the gesture 213 - sensing movement of the one or more points on the at least one hand of the requester in three-dimensional space over time while the gesture is repeated 215 - comparing a plurality of aspects of the sensed movement to the recorded movement 217 - when a threshold number of the compared plurality of aspects match, authenticating the requester as the user and granting the requester access to the user profile

GESTURE-BASED USER AUTHENTICATION

TECHNICAL FIELD

This application relates generally to systems, methods and apparatuses, including computer program products, for gesture-based user authentication.

BACKGROUND

Increasingly people are storing and managing more sensitive personal and financial information on computers and on-line. Protecting that information is extremely important with entire industries devoted to data security. The most common tool for protecting access to data remains the password. However, the shortcomings of password protection are well known and passwords have become increasingly long and complex as a result. Additionally, with the advent of augmented (AR) and virtual reality (VR) and the associated controllers and headsets, user's hands and eyes are often removed from physical keyboards which, along with increasingly long passwords, has made the use of text passwords difficult. Present solutions include virtual keyboards but their use can be cumbersome. Solutions such as voice passwords can pose a security risk as they can be recorded or overheard, especially in a public setting where an individual may not be completely aware of their surroundings while using an AR or VR headset. Accordingly, there exists a need for an easier to use, secure authentication method compatible with virtual reality environments.

SUMMARY

Systems and methods of the invention include gesture-based authentication methods that track movement of points on a user's hand(s) through space to create, store, and compare gesture-based authentication. For example, a user may be prompted to create a gesture-based authentication by a system of the invention. The user can be provided with a hand movement to mimic, either with text of image/video prompts or may be allowed to create a freeform gesture, Using sensors on the hand(s) or camera tracking of the hand(s) points on the palm and/or one to ten fingers can be recorded as they move through space to create the gesture. That recording can then be stored as a model to which subsequent gestures can be compared to authenticate that user.

Thresholds can be set to allow for variation in timing or exact range of motion when attempting to recreate the stored motion in subsequent authentication attempts. The static relationship of the points to each other is dependent on the exact size and shape of the user's hand, providing an additional security measure in addition to the unique movement of that user's stored gesture. In various embodiments, distinguishing marks, skin tone, size, shape, wrinkles, vein topography, and other physical characteristics can be incorporated into the authentication methods as well to supplement gesture similarity in authenticating the user.

In contrast to methods that may use fixed, static hand gestures or pre-defined gestures, systems and methods of the present invention allow for spontaneous, user-created gestures and the added layer of dynamic tracking of user movements while performing the gesture, making recreation by an unauthorized user more difficult. Additionally, by tracking multiple points on the hand including fingers and palm, the presently described systems and methods provide more user and gesture-specific data points such as rotation, scale, and velocity, thereby increasing the complexity and distinctiveness of the gesture authentication.

Aspects of the invention can include computerized methods for user authentication. Methods can comprise prompting, via a computing device comprising a non-transitory memory in communication with a processor, a user to make a gesture with one or both of their hands; tracking and recording, using one or more sensors in communication with the computing device, movement of one or more points on at least one hand of the user in three-dimensional space over time while the gesture is made; storing, in the non-transitory memory, the recorded movement associated with a user profile for the user; receiving at the computing device, a request from a requester to access the user profile; requesting, via the computing device, the requester to repeat the gesture; sensing movement of the one or more points on the at least one hand of the requester in three-dimensional space over time while the gesture is repeated; comparing a plurality of aspects of the sensed movement to the recorded movement; and when a threshold number of the compared plurality of aspects match, authenticating the requester as the user and granting the requester access to the user profile.

The tracked and recorded one or more points on at least one hand can comprise points selected from the group consisting of one or more fingertips, one or more knuckles, a palm, and one or more points on a back of the at least one hand. In some embodiments, the tracked and recorded one or more points on at least one hand can comprise all fingertips and the palm. The plurality of aspects may include one or more of hand size, hand shape, finger length, distance of motion of one or more fingers, direction of motion of one or more fingers, speed of motion of one or more fingers, distance of motion of a palm, direction of motion of a palm, speed of motion of a palm, skin texture of the at least one hand, skin tone of the at least one hand, vein location on the at least one hand, vein size on the at least one hand, and location, shape, and/or size of one or more naevi, scars, wrinkles, fingerprints, or other permanent marks on the at least one hand.

In certain methods, prompting the gesture can include providing, via an output device in communication with the computing device, a suggested gesture for the user to perform. The tracking and recording step may be ended when the one or more sensors sense movement of the one or more points stop for a preselected amount of time. In some embodiments, the tracking and recording step can be ended after a preselected amount of time. The comparing step can further comprise determining a match between one of the plurality of aspects of the sensed movement and one of the plurality of aspects of the recorded movement where a present threshold similarity score is detected. In certain embodiments, the preset similarity score may be selected for each of the plurality of aspects. The one or more sensors may be located remotely from the at least one hand. The one or more sensors can comprise one or more of a camera, an infrared camera, and a light emitting diode.

In various embodiments, the one or more sensors can be located on the at least one hand. Methods may include, before the storing step, replaying the recorded movement using an output device in communication with the computing device; and requesting acceptance of the recorded movement by the user.

In certain aspects, systems of the invention can include a computer system for user authentication. The system can comprise a computing device comprising a processor and a memory storing instructions that, when executed by the processor, cause the processor to perform a series of steps.

Those steps can include prompting, via a computing device comprising a non-transitory memory in communication with a processor, a user to make a gesture with one or both of their hands; tracking and recording, using one or more sensors in communication with the computing device, movement of one or more points on at least one hand of the user in three-dimensional space over time while the gesture is made; storing, in the non-transitory memory, the recorded movement associated with a user profile for the user; receiving at the computing device, a request from a requester to access the user profile; requesting, via the computing device, the requester to repeat the gesture; sensing movement of the one or more points on the at least one hand of the requester in three-dimensional space over time while the gesture is repeated; comparing a plurality of aspects of the sensed movement to the recorded movement; and where a threshold number of the compared plurality of aspects match, authenticating the requester as the user and granting the requester access to the user profile. In various embodiments systems of the invention can be operable to perform any and all of the aforementioned methods.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 2 shows an exemplary method for gesture-based user authentication.

DETAILED DESCRIPTION

Figure 1:
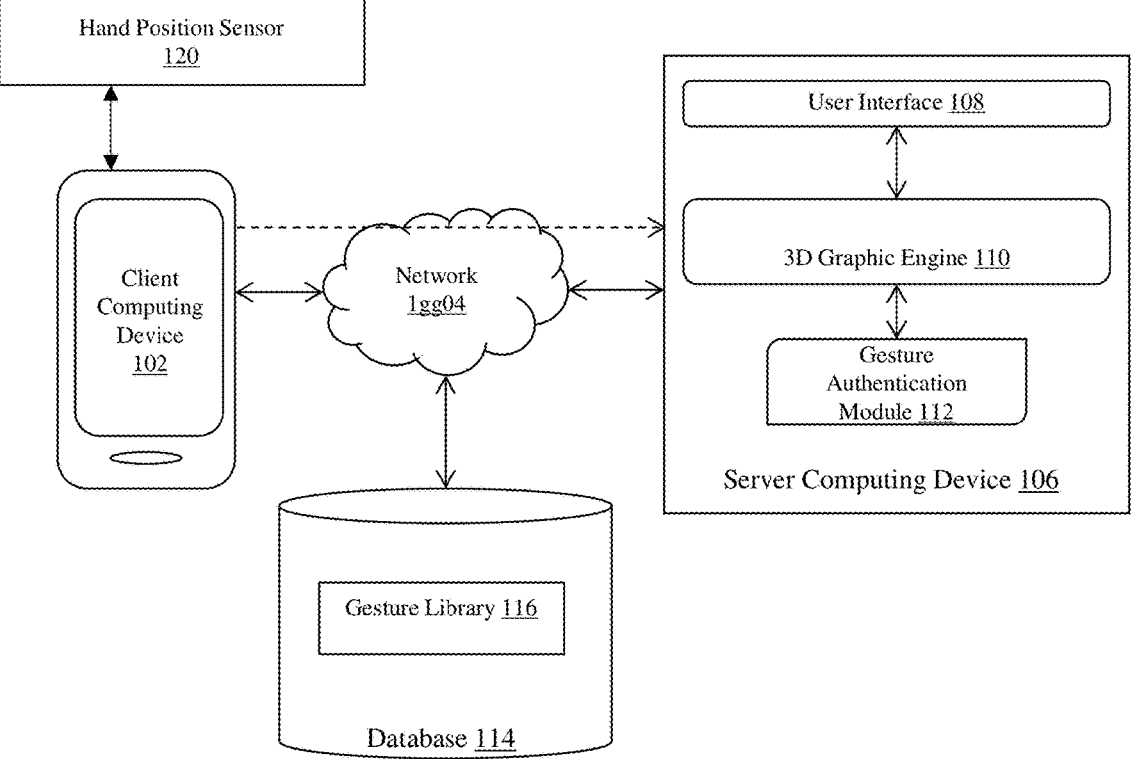
FIG. 1 is a block diagram of a system for gesture-based user authentication.

FIG. 1 is a block diagram of an exemplary system 100 for gesture authentication. The system 100 includes a client computing device 102; a communications network 104; a server computing device 106 that includes a user interface module 108, a 3D graphics engine 110, and a gesture authentication module 112; a database 114 that includes a gesture library 116, and one or more hand position sensors 120.

The client computing device 102 connects to one or more communications networks (e.g., network 104) in order to communicate with the server computing device 106 to provide input and receive output relating to user authentication and/or materials or files subject to user authentication. Exemplary client computing devices 102 include but are not limited to server computing devices, desktop computers, laptop computers, tablets, mobile devices, smartphones, and the like. Typically, the client computing device 102 includes a display device (not shown) that is embedded in and/or coupled to the client computing device for the purpose of displaying information to a user of the device. It should be appreciated that other types of computing devices that are capable of connecting to the components of the system 100 can be used without departing from the scope of invention. Although FIG. 1 depicts one client computing device 102, it should be appreciated that the system 100 can include any number of client computing devices. The client computer device can be in communication with one or more input/output devices including one or more hand position sensors 120. Such sensors can include a camera, an infrared camera, and/or a light emitting diode. The sensors 120 can be incorporated into, for example, a VR or AR headset worn by the user. Exemplary hand tracking devices are available from, for example, Ultraleap Limited (Bristol, UK). In various embodiments, the one or more sensors 120 can be located on the at least one hand, Exemplary hand position sensors 120 including wearable sensors are discussed by Chen, et al., A Survey on Hand Pose Estimation with Wearable Sensors and Computer-Vision-Based Methods, Sensors. 2020; 20 (4): 1074. https://doi.org/10.3390/s2004107, incorporated herein by reference.

In some embodiments, the client computing device 102 can execute one or more software applications that are used to provide input to and receive output from the server computing device 106. For example, the client computing device 102 can be configured to execute one or more native applications and/or one or more browser applications. Generally, a native application is a software application (in some cases, called an 'app') that is installed locally on the client computing device 102 and written with programmatic code designed to interact with an operating system that is native to the client computing device 102. Such software may be available from, e.g., the Apple® App Store, the Google® Play Store, the Microsoft® Store, or other software download platforms depending upon, e.g., the type of device used. In some embodiments, the native application includes a software development kit (SDK) module that is executed by a processor of the client computing device 102 to perform functions associated with 3D environments, hand tracking, and/or user authentication. Generally, a browser application comprises software executing on a processor of the client computing device 102 that enables the client computing device to communicate via HTTP or HTTPS with remote servers addressable with URLs (e.g., server computing device 106) to receive website-related content, including one or more webpages, for rendering in the browser application and presentation on the display device coupled to the client computing device 102. Exemplary mobile browser application software includes, but is not limited to, Firefox™, Chrome™, Safari™, and other similar software. The one or more webpages can comprise visual and audio content for display to and interaction with a user.

The communications network 104 enables the client computing device 102 to communicate with the server computing device 106. The network 104 is typically comprised of one or more wide area networks, such as the Internet and/or a cellular network, and/or local area networks. In some embodiments, the network 104 is comprised of several discrete networks and/or sub-networks (e.g., cellular to Internet).

The server computing device 106 is a device including specialized hardware and/or software modules that execute on a processor and interact with memory modules of the server computing device 106, to receive data from other components of the system 100, transmit data to other components of the system 100, and perform functions for automatic monitoring, deciphering, and cataloging of messages passing through the trading execution platform. The server computing device 106 includes a user interface module 108, a 3D graphics engine 110, and a gesture authentication module 112 that execute on the processor of the server computing device 106. In some embodiments, the modules 108, 110, and 112 are specialized sets of computer software instructions programmed onto one or more dedicated processors in the server computing device 106 and can include specifically designated memory locations and/or registers for executing the specialized computer software instructions. The user interface 108 can provide prompts to the user to record or create gestures or recreate gestures for authentication purposes as well as communicate with the user during the gesture saving or authentication process. The 3D graphic engine 110 can allow the hand-tracking information from the sensor 120 to be processed into a 3D environment for saving a template or comparing subsequent authentication attempts to a saved template by the gesture authentication module 112. The virtual user's hand created with the 3D graphic engine 110 can also be displayed to the user in real time on the client computer device 102 or an input/output device such as a display or VR or AR headset in communication with the client computer device 102. Exemplary 3D graphics environments or engines 110 can include, for example, Unity, Unreal Engine, or WebGL.

Although the computing modules 108, 110, and 112 are shown in FIG. 1 as executing within the same server computing device 106, in some embodiments the functionality of the computing modules 108, 110, and 112 can be distributed among a plurality of server computing devices. As shown in FIG. 1, the server computing device 106 enables the computing modules 108, 110, and 112 to communicate with each other in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention. The exemplary functionality of the computing modules 108, 110, and 112 is described in detail throughout this specification.

The database 114 is a computing device (or in some embodiments, a set of computing devices) coupled to the server computing device 106 (in some embodiments, via communications network 104) and is configured to receive, generate, and store specific segments of data relating to the process of gesture-based user authentication. In some embodiments, all or a portion of the database 114 can be integrated with the server computing device 106 or be located on a separate computing device or devices. The database 114 can comprise one or more databases configured to store portions of data used by the other components of the system 100, as will be described in greater detail below.

In some embodiments, the database 114 comprises a gesture library data 116. Generally, the gesture library 116 comprises data and metadata associated with individual authentication gestures as recorded by specific users. The library 116 can include the recorded movement of specific tracked points of the user's hand while performing an authentication gesture as recorded with one or more hand position sensors and translated into a 3D virtual environment using a 3D graphics engine.

While the architecture depicted in FIG. 1 may be applied to, for example, webapp embodiments, it should be appreciated that different architectures may be employed within the contemplated scope of the invention. For example, instead of a 3D Graphics Engine 110, User Interface 108, and Gesture Authentication Module 112 being present in a server 106 with the client 102 acting as a presentation layer, in certain non-browser use cases such as native mobile, XR, and desktop applications, those components may be distributed differently. In such scenarios any or all of the 3D graphics Engine 110, User Interface 108, and Gesture Module 112 may be integrated in the client 102.

FIG. 2 shows an exemplary method 201 for user authentication including prompting 203, via a computing device comprising a non-transitory memory in communication with a processor, a user to make a gesture with one or both of their hands. The user's hands can then be positioned for tracking either by donning one or more wearable sensors (e.g., a glove) or moved within range of a visual sensor (e.g., one or more cameras), Methods can then include tracking and recording 205, using the one or more sensors in communication with the computing device, movement of one or more points on at least one hand of the user in three-dimensional space over time while the gesture is made.

The recorded movement can then be associated with a user profile for the user and stored 207 in the non-transitory memory. That stored recorded movement can then serve as a template or passkey to which future authentication attempts are compared before authenticating a user. The authentication process can include receiving 209 at the computing device, a request from a requester to access the user profile. Once the user requests authentication or attempts to access user-restricted data, the computing device can prompt or request 211 the user to perform the authentication gesture. In certain embodiments, even the type of gesture itself can be part of the authentication process. The system can provide little or no detail on what the gesture to be performed is meaning that an unauthorized user's first hurdle in recreating the gesture would be identifying what hand movements to make. However, because the individual movements of multiple points on a user's palm and fingers in performing a gesture including rotation, scale, an velocity are so unique to a user, in certain embodiments the system may provide a prompt during authentication that includes a text or even video description of the gesture to be performed. The user could thereby be relieved of the burden of remembering what gesture was made in the recording/saving phase.

As the requester performs the gesture in an attempt to authenticate, methods can include sensing 213 movement of the one or more points on the at least one hand of the requester in three-dimensional space over time while the gesture is repeated. A plurality of aspects of the sensed movement can then be compared 215 to the recorded movement. When a threshold number of the compared plurality of aspects match, methods can comprise authenticating 217 the requester as the user and granting the requester access to the user profile.

Figure 3:
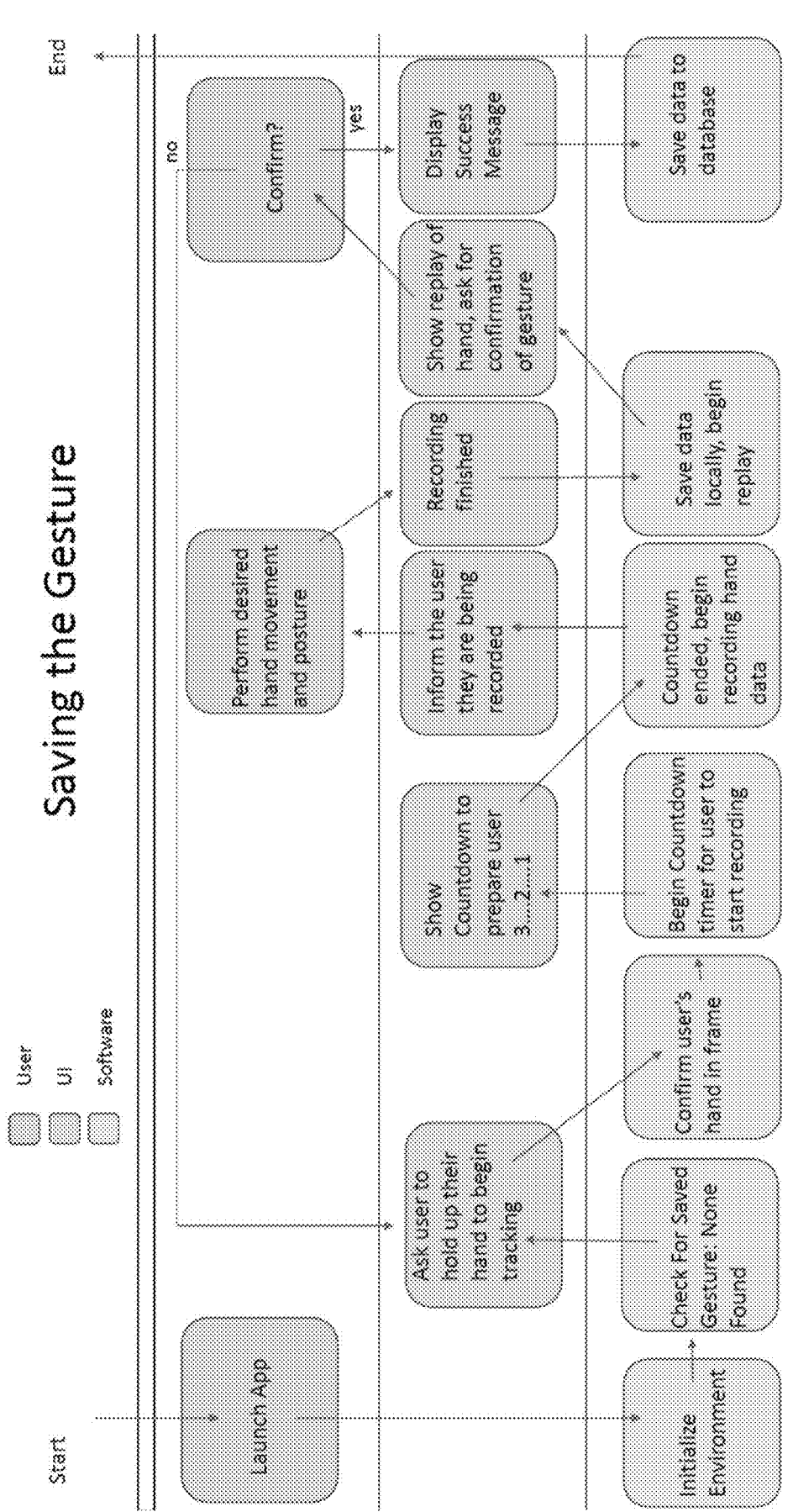
FIG. 3 shows an exemplary flow chart for saving a gesture for user authentication.

FIG. 3 shows an exemplary flow chart for saving a gesture for user authentication. A user launches the authentication application which may be a native application on their computer, a remote application accessed via a network connection. In some embodiments, the authentication application can have various components stored locally and remotely. Launching the authentication application will cause the authentication software to initialize the environment for 3D tracking. The software can then check the user information to see if a gesture has been previously saved. If not, the software can initiate a gesture creation process. The application, via a user interface, can then prompt the user to hold their hands up or otherwise position or motion their hands to initiate hand tracking. The software can then confirm that the user's hands are appropriately positioned and provide further prompts if they are not.

Upon verifying that the user's hands are within the sensor frame, the software can initiate a countdown timer before the gesture recording starts. The user interface can provide visual and/or audio cues for the countdown to indicate to the user that the recording is about to begin. Alternatively, the software can allow the user to immediately initiate recording through a selected motion or text or voice command. For example the software can relay, through the user interface, to the user that recording will begin upon the user speaking the phrase "record". Upon expiry of the countdown timer or receipt of another recording signal, the software can begin recording the user's hand motion and may relay that fact to the user through the user interface. The user can then perform their desired hand movement to be saved as their authentication gesture. The gesture can be spontaneous or may be prompted or suggested by the software through the user interface.

The recording can then end. Ending can be prompted, for example, by a lack of hand movement for a selected amount of time (e.g., 1 to 2 seconds of minimal hand movement), by the hands moving out of frame, or after a selected amount of time from recording starting. The software can then save the recording locally (e.g., to a cache on the user's local computer) and initiate a replay of the recorded motion. The replay can be shown to the user via the user interface and the user can be asked to accept or re-record the gesture. If the user confirms or accepts the gesture, the gesture can be saved by the software to a database for future reference including in remote access situations from other computing devices. The successful creation of the gesture can be relayed to the user through the user interface.

Figure 4:
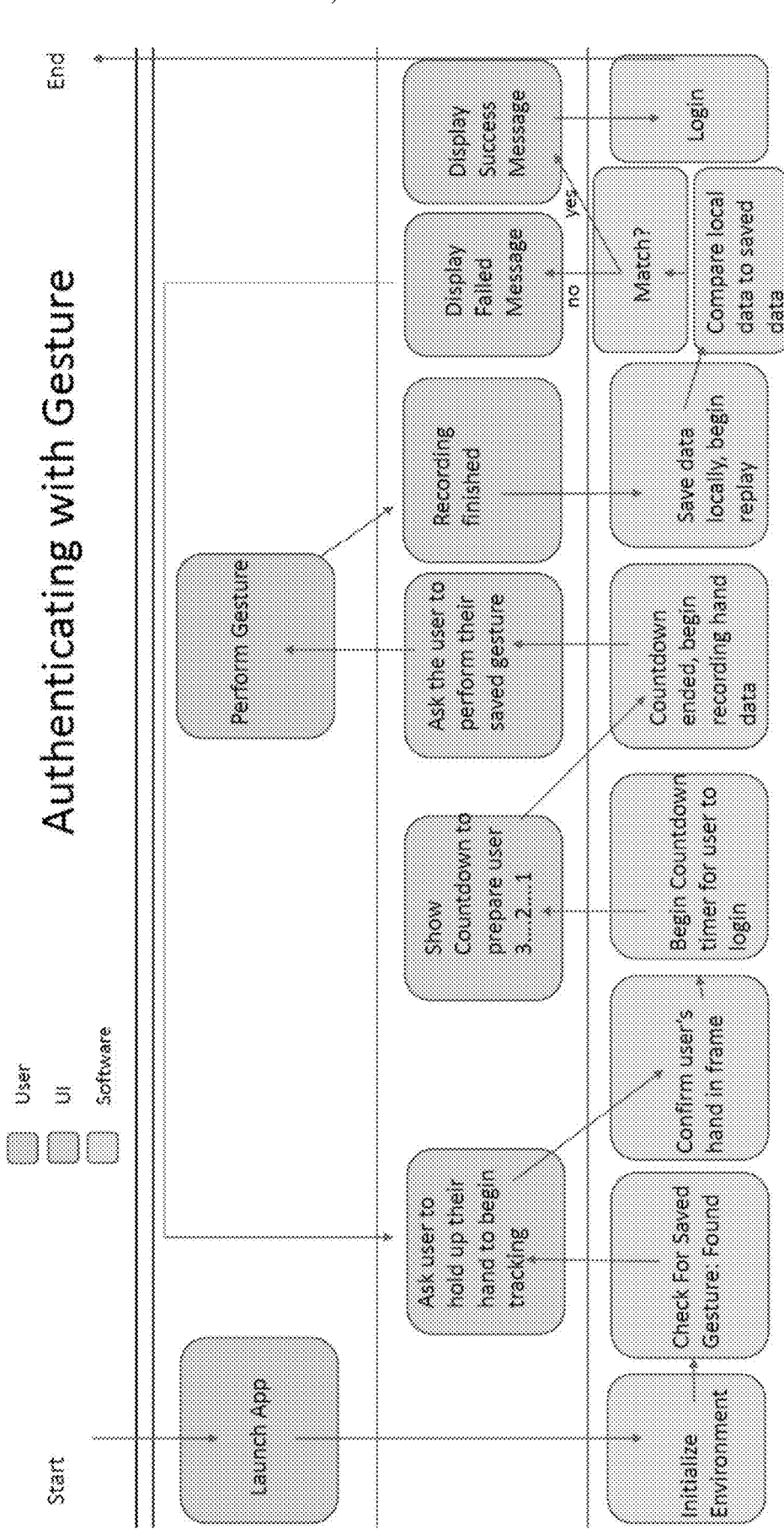
FIG. 4 shows an exemplary flow chart for authenticating a user gesture.

FIG. 4 shows an exemplary flow chart for authenticating a user gesture. As with saving the gesture, the user launches the gesture authentication application which causes the software to initialize the environment and check for a saved gesture. In the case of subsequent authentication, the system will identify that a saved gesture exists linked to the user account and can ask the user through the user interface to hold their hands up to initiate hand tracking. After confirming that the user's hands are in position for tracking, the system can instruct the user perform the authentication gesture. This instruction can include a countdown before the software begins recording and the countdown can be displayed to the user via the user interface. At the end of the countdown or upon informing the user that recording is beginning, the software can begin recording the user's hand motions using one or more hand position sensors. The user can then perform the gesture and recording can stop.

The recorded gesture can be saved locally or temporarily for comparison by the software to the saved gesture that was initially created by the user and that may be stored in a gesture library in a database. If the comparison is successful, the user can be informed and the user can be authenticated (e.g., logged in or granted access to requested secure data). If the comparison fails, the user can be informed and the process can repeat to allow the user to reattempt the gesture. In certain embodiments, a maximum number of attempts may be allowed (e.g., three) before an action is taken such as locking the account, notifying an administrator, sending a notification to a user e-mail or phone, or freezing the login process for a selected amount of time.

Figure 5:
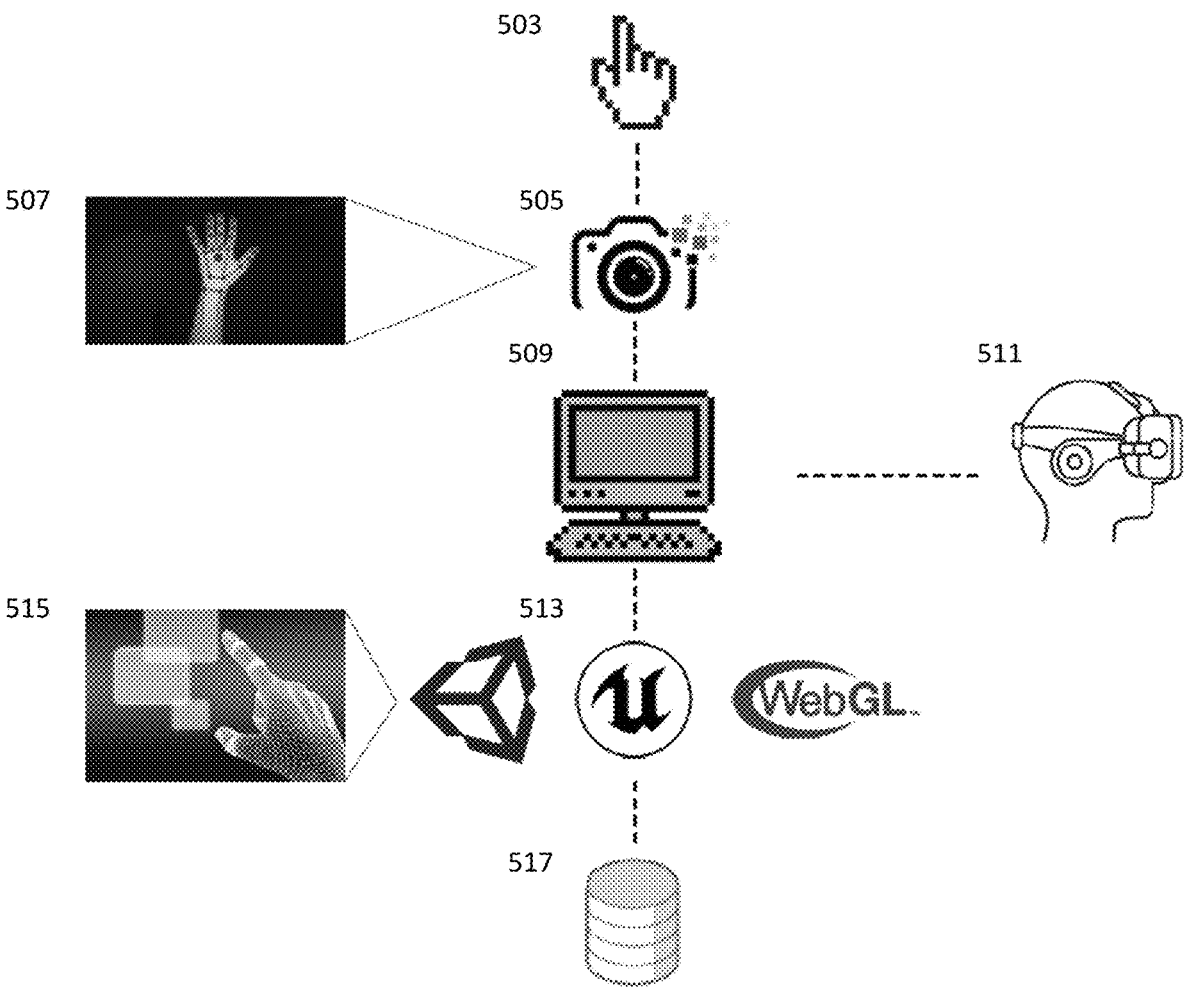
FIG. 5 shows an exemplary system architecture for gesture-based user authentication.

FIG. 5 shows an exemplary system architecture 501. Images of a user's real hand 503 are captured by a camera 505 and key points 507 on the hand for tracking are determined. A local computer 509 and/or VR or AR headset 511 process the camera tracking data into a 3D environment 513 such as Unity, Unreal Engine, or WebGL to create virtual version of the user's hand 515, the motion of which can be stored as a passkey in a database 517 or compared to an already stored passkey in the database 517 to authenticate the user.

Systems and methods of the invention can allow use of hand tracking as a form of authentication. A user can create a unique hand gesture by moving their hand or creating different symbols with fingers and save it as a form of login. Exemplary gestures can include making a first and moving it in a circle, counting up or down with fingers, bringing one or both hands upwards while opening fingers, or any other movement of fingers and/or hand(s).

When authenticating at a later time, a user can recreate the gesture that they saved earlier as an alternative to things such as passwords, codes, iris scanning, etc. Exemplary tracking data that might be saved and used to compare gestures can include, for example, position/rotation of palm and fingertips, hand size (palm width, finger length, etc.), hand and/or finger velocity to track movement, hand orientation (facing towards or away from sensor), and finger posture (e.g., pinky extended or thumb tucked in). Any aspect of the movement through space of each tracked point (e.g., each joint of each finger, each fingertip, various fixed points on the palm, or the wrist) either relative to a fixed point in space or in relation to each other tracked point on the hand(s) can be saved and used to compare a saved gesture to a new gesture for authentication.

Data can be used to replay the saved gesture with a virtual hand on screen to the user for confirmation. Replay can be via a two-dimensional monitor or may be a three-dimensional rendering in a virtual reality headset, for example.

In various embodiments, gesture authentication can be used as a replacement to a QR code, OTP through SMS, email or authenticator app in two factor authentication. Systems and methods can account for age and build in increasing tolerance to account for user's developing a shakier hand for example. Systems and methods of the invention can have a selectable threshold or tolerance for differences in range of motion and/or timing or any other tracked feature of the hand movement to accommodate expected variations in user hand movements during subsequent authentication attempts. The thresholds can be selected by an administrator to balance security with repeatability for users. Hand gesture tracking can be combined with other biometric authentication methods such as voice or fingerprint identification to increase security. In certain embodiments, camera recording of hands to track motion can also provide information including vein topography, hand size and shape, skin texture or tone, or the presence of moles, scars, or other identifying marks. That information can supplement gesture tracking to authenticate a user through comparison to a saved gesture recording.

An exemplary gesture recording process can include creating empty lists of 'ReplayData' for each hand and resetting counters. A 'ReplayData' file for use with, for example, the Unity 3D engine, may contain any or all of the following data: a list of Vector3 for position; a list of Vector3 for scale, a list of Quaternion for rotation, a list of Vector3 for palmNormal orientation, a Vector3 for palmVeclocity (speed of hand), a Vector3 for palmPosition, a Boolean for pinkyIsExtended, a Boolean for ringIsExtended, a Boolean for middleIsExtended, a Boolean for indexIsExtended, and a. Boolean for thumbIsExtended.

While recording, the system can verify tracked hands being observable using the system sensors. The system can create a ReplayData object for each frame of the recording and fill with necessary info and add it to the list. The frame rate of the recording can be selected by the administrator to balance file size and security. After the recording is finished, the recorded data can be used to show a replay of a virtual hand to allow the user to review the recorded gesture. The position data can be used to position and rotate a temporary hand mesh.

Once authentication is requested, a comparison of saved data can be started to attempt to recreate another hand gesture to match the one that has been saved. The process may be the same as described above, saving relevant data to lists of ReplayData. When the second set of recording has finished, the system can compare recently saved data with the data that was saved before. Comparison can include, for example, comparing velocities. The data can be split into equal divisions (e.g., four in the following example). For each division, the average velocity is taken. A user may have been delayed when starting a hand gesture. To accommodate this, in certain embodiments, comparison can be between adjacent divisions (e.g., comparing the first recorded division to the second authenticating division). If all divisions are able to be matched to an adjacent division, then the velocities are deemed to match. A similar analysis can be performed with respect to hand position. If all averages match, positions are considered to match. Similar tests can be run for scale and rotation. A percentage threshold can be used to allow for variation when determining if data sets are similar. For example, a threshold of 95% or greater similarity may allow authentication.

Similar analyses can be performed with finger postures. In an exemplary embodiment, that comparison can use Booleans (e.g., a binary value of true or false for each finger being extended). The system can check the total number of 'TRUES' that occur within a division and see if it is above a certain threshold. If percentage of TRUE is above threshold, that division is considered TRUE, false otherwise. This determines the 'average' Boolean value of the division. That average Boolean value can then be compared with adjacent divisions in a similar approach to that used with the positions and velocities. Finally, when comparing the old data with the new data, if velocities match, positions match, and finger postures match, the gestures can be considered to be a match.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile computing device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile computing device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computerized method for user authentication, the method comprising:
    prompting, via a computing device comprising a non-transitory memory in communication with a processor, a user to make a gesture with one or both of their hands;
    tracking and recording, using one or more sensors in communication with the computing device, movement of one or more points on at least one hand of the user in three-dimensional space over time while the gesture is made, wherein the tracked and recorded one or more points on at least one hand comprise points selected from the group consisting of one or more fingertips, one or more knuckles, a palm, and one or more points on a back of the at least one hand;
    storing, in the non-transitory memory, the recorded movement associated with a user profile for the user;
    receiving at the computing device, a request from a requester to access the user profile;
    requesting, via the computing device, the requester to repeat the gesture;
    sensing movement of the one or more points on the at least one hand of the requester in three-dimensional space over time while the gesture is repeated;
    comparing a plurality of aspects of the sensed movement to the recorded movement; and
    when a threshold number of the compared plurality of aspects match, authenticating the requester as the user and granting the requester access to the user profile.

2. The computerized method of claim 1, wherein the tracked and recorded one or more points on at least one hand comprise all fingertips and the palm.

3. The computerized method of claim 1, wherein the plurality of aspects comprise one or more of hand size, hand shape, finger length, distance of motion of one or more fingers, direction of motion of one or more fingers, speed of motion of one or more fingers, distance of motion of a palm, direction of motion of a palm, speed of motion of a palm, skin texture of the at least one hand, skin tone of the at least one hand, vein location on the at least one hand, vein size on the at least one hand, and location, shape, or size of one or more naevi, scars, wrinkles, fingerprints, or other permanent marks on the at least one hand.

4. The computerized method of claim 1, wherein prompting the gesture comprises providing, via an output device in communication with the computing device, a suggested gesture for the user to perform.

5. The computerized method of claim 1, wherein the tracking and recording step is ended when the one or more sensors sense movement of the one or more points stop for a preselected amount of time.

6. The computerized method of claim 1, wherein the tracking and recording step is ended after a preselected amount of time.

7. The computerized method of claim 1, wherein the comparing step further comprises determining a match between one of the plurality of aspects of the sensed movement and one of the plurality of aspects of the recorded movement where a present threshold similarity score is detected.

8. The computerized method of claim 7, wherein the preset similarity score is selected for each of the plurality of aspects.

9. The computerized method of claim 1, wherein the one or more sensors are located remotely from the at least one hand.

10. The computerized method of claim 9, wherein the one or more sensors comprise one or more of a camera, an infrared camera, and a light emitting diode.

11. The computerized method of claim 1, wherein the one or more sensors are located on the at least one hand.

12. The computerized method of claim 1, further comprising, before the storing step,
    replaying the recorded movement using an output device in communication with the computing device; and
    requesting acceptance of the recorded movement by the user.

13. A computer system for user authentication, the system comprising a computing device comprising a processor and a memory storing instructions that, when executed by the processor, cause the processor to perform the steps of:

prompting, via a computing device comprising a non-transitory memory in communication with a processor, a user to make a gesture with one or both of their hands;

tracking and recording, using one or more sensors in communication with the computing device, movement of one or more points on at least one hand of the user in three-dimensional space over time while the gesture is made, wherein the tracked and recorded one or more points on at least one hand comprise points selected from the group consisting of one or more fingertips, one or more knuckles, a palm, and one or more points on a back of the at least one hand;

storing, in the non-transitory memory, the recorded movement associated with a user profile for the user;

receiving at the computing device, a request from a requester to access the user profile;

requesting, via the computing device, the requester to repeat the gesture;

sensing movement of the one or more points on the at least one hand of the requester in three-dimensional space over time while the gesture is repeated;

comparing a plurality of aspects of the sensed movement to the recorded movement; and where a threshold number of the compared plurality of aspects match, authenticating the requester as the user and granting the requester access to the user profile.

14. The computer system of claim 13, wherein the tracked and recorded one or more points on at least one hand comprise all fingertips and the palm.

15. The computer system of claim 13, wherein the plurality of aspects comprise one or more of hand size, hand shape, finger length, distance of motion of one or more fingers, direction of motion of one or more fingers, speed of motion of one or more fingers, distance of motion of a palm, direction of motion of a palm, speed of motion of a palm, skin texture of the at least one hand, skin tone of the at least one hand, vein location on the at least one hand, vein size on the at least one hand, and location, shape, or size of one or more naevi, scars, wrinkles, fingerprints, or other permanent marks on the at least one hand.

16. The computer system of claim 13, wherein prompting the gesture comprises providing, via an output device in communication with the computing device, a suggested gesture for the user to perform.

17. The computer system of claim 13, wherein the tracking and recording step is ended when the one or more sensors sense movement of the one or more points stop for a preselected amount of time.

18. The computer system of claim 13, wherein the tracking and recording step is ended after a preselected amount of time.

19. The computer system of claim 13, wherein the comparing step further comprises determining a match between one of the plurality of aspects of the sensed movement and one of the plurality of aspects of the recorded movement where a present threshold similarity score is detected.

20. The computer system of claim 19, wherein the preset similarity score is selected for each of the plurality of aspects.

21. The computer system of claim 13, wherein the processor is further operable, before the storing step, to perform the steps of:

replaying the recorded movement using an output device in communication with the computing device; and requesting acceptance of the recorded movement by the user.

* * * * *